(12) United States Patent
    Marwah et al.

(10) Patent No.: US 11,269,995 B2
(45) Date of Patent: Mar. 8, 2022

(54) CHAIN OF EVENTS REPRESENTING AN ISSUE BASED ON AN ENRICHED REPRESENTATION

(71) Applicant: ENTIT SOFTWARE LLC, Sanford, NC (US)

(72) Inventors: Manish Marwah, Palo Alto, CA (US); Mijung Kim, Sunnyvale, CA (US); Martin Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 183 days.

(21) Appl. No.: 16/170,105

(22) Filed: Oct. 25, 2018

(65) Prior Publication Data

US 2020/0134175 A1   Apr. 30, 2020

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/55* | (2013.01) | |
| *H04L 29/06* | (2006.01) | |
| *H04L 43/045* | (2022.01) | |
| *H04L 41/0631* | (2022.01) | |
| *H04L 41/0654* | (2022.01) | |
| *G06F 9/54* | (2006.01) | |

(52) U.S. Cl.
CPC .......... *G06F 21/554* (2013.01); *G06F 9/542* (2013.01); *G06F 21/552* (2013.01); *H04L 41/064* (2013.01); *H04L 41/065* (2013.01); *H04L 41/0654* (2013.01); *H04L 43/045* (2013.01); *H04L 63/1425* (2013.01); *H04L 63/1433* (2013.01); *H04L 63/1441* (2013.01); *G06F 2221/034* (2013.01)

(58) Field of Classification Search
CPC ...... G06F 21/554; G06F 21/552; G06F 9/542; G06F 2221/034; H04L 63/1433; H04L 63/1425; H04L 63/1441; H04L 41/065; H04L 41/064; H04L 41/0654; H04L 43/045; H04L 63/1416; H04L 41/142; H04L 41/0631
See application file for complete search history.

(56) References Cited

U.S. PATENT DOCUMENTS

| | | | |
|---|---|---|---|
| 9,225,730 B1 * | 12/2015 | Brezinski | ................ G06F 21/00 |
| 9,245,233 B2 | 1/2016 | Goldschmidt et al. | |
| 10,038,707 B2 | 7/2018 | Muddu et al. | |
| 10,043,006 B2 | 8/2018 | Puri et al. | |

(Continued)

OTHER PUBLICATIONS

Akoglu et al., Graph based Anomaly Detection and Description: A Survey, 2014 (68 pages).
Cylance, CylancePROTECT, Continuous Threat Prevention Powered by Artificial Intelligence downloaded Sep. 30, 2018 (2 pages).

(Continued)

*Primary Examiner* — Trong H Nguyen

(57) ABSTRACT

In some examples, a system constructs, based on event data representing a plurality of events in a system, a representation of the plurality of events, the representation including information relating the events, and computes issue indications corresponding to potential issues in the system. The system adds information based on the issue indications to the representation to form an enriched representation, and searches the enriched representation to find a chain of events representing an issue in the system.

18 Claims, 7 Drawing Sheets

(56) References Cited

U.S. PATENT DOCUMENTS

| | | | | |
|---|---|---|---|---|
| 10,521,584 | B1* | 12/2019 | Sharifi Mehr | H04L 63/1425 |
| 10,673,880 | B1* | 6/2020 | Pratt | H04L 63/20 |
| 2008/0022407 | A1* | 1/2008 | Repasi | G06F 21/56 726/25 |
| 2015/0249676 | A1* | 9/2015 | Koyanagi | H04L 63/1425 726/22 |
| 2015/0341379 | A1* | 11/2015 | Lefebvre | H04W 12/08 726/22 |
| 2016/0371489 | A1* | 12/2016 | Puri | G06F 16/254 |
| 2017/0032130 | A1 | 2/2017 | Joseph et al. | |
| 2017/0063887 | A1* | 3/2017 | Muddu | H04L 63/1408 |
| 2018/0034840 | A1* | 2/2018 | Marquardt | G06F 16/9024 |
| 2018/0241654 | A1* | 8/2018 | Danichev | H04L 43/067 |
| 2018/0316727 | A1* | 11/2018 | Tsironis | H04L 63/20 |
| 2019/0124104 | A1* | 4/2019 | Apostolopoulos | G06F 16/9024 |
| 2021/0124983 | A1* | 4/2021 | Axenie | G06K 9/6263 |

OTHER PUBLICATIONS

Cylance, Math vs. Malware downloaded Sep. 30, 2018 (5 pages).

Davis et al., Data preprocessing for anomaly based network intrusion detection: A review, Computers & Security 30 (2011) (23 pages).

Lo et al., Distance Measurement Methods for Improved Insider Threat Detection, Jan. 2018 (20 pages).

Mehta et al., Ranking Attack Graphs, D. Zamboni and C. Kruegel (Eds.): Raid 2006, LNCS 4219, pp. 127-144, 2006 (18 pages).

Sheyner et al., Automated Generation and Analysis of Attack Graphs, IEEE Symposium on Security and Privacy, 2002 (12 pages).

Sommer et al., Outside the Closed World: On Using Machine Learning for Network Intrusion Detection, IEEE Symposium on Security and Privacy, 2010 (12 pages).

Tuor et al., Deep Learning for Unsupervised Insider Threat Detection in Structured Cybersecurity Data Streams, 2017 (9 pages).

Woodie, Alex, Machine Learning's Big Role in the Future of Cybersecurity, Nov. 16, 2015 (3 pages).

* cited by examiner

US 11,269,995 B2

CHAIN OF EVENTS REPRESENTING AN ISSUE BASED ON AN ENRICHED REPRESENTATION

BACKGROUND

A computing environment can include a network of computers and other types of devices. Issues can arise in the computing environment due to behaviors of various entities. Monitoring can be performed to detect such issues, and to take remedial actions to address the issues.

BRIEF DESCRIPTION OF THE DRAWINGS

Some implementations of the present disclosure are described with respect to the following figures.

Figure 1:
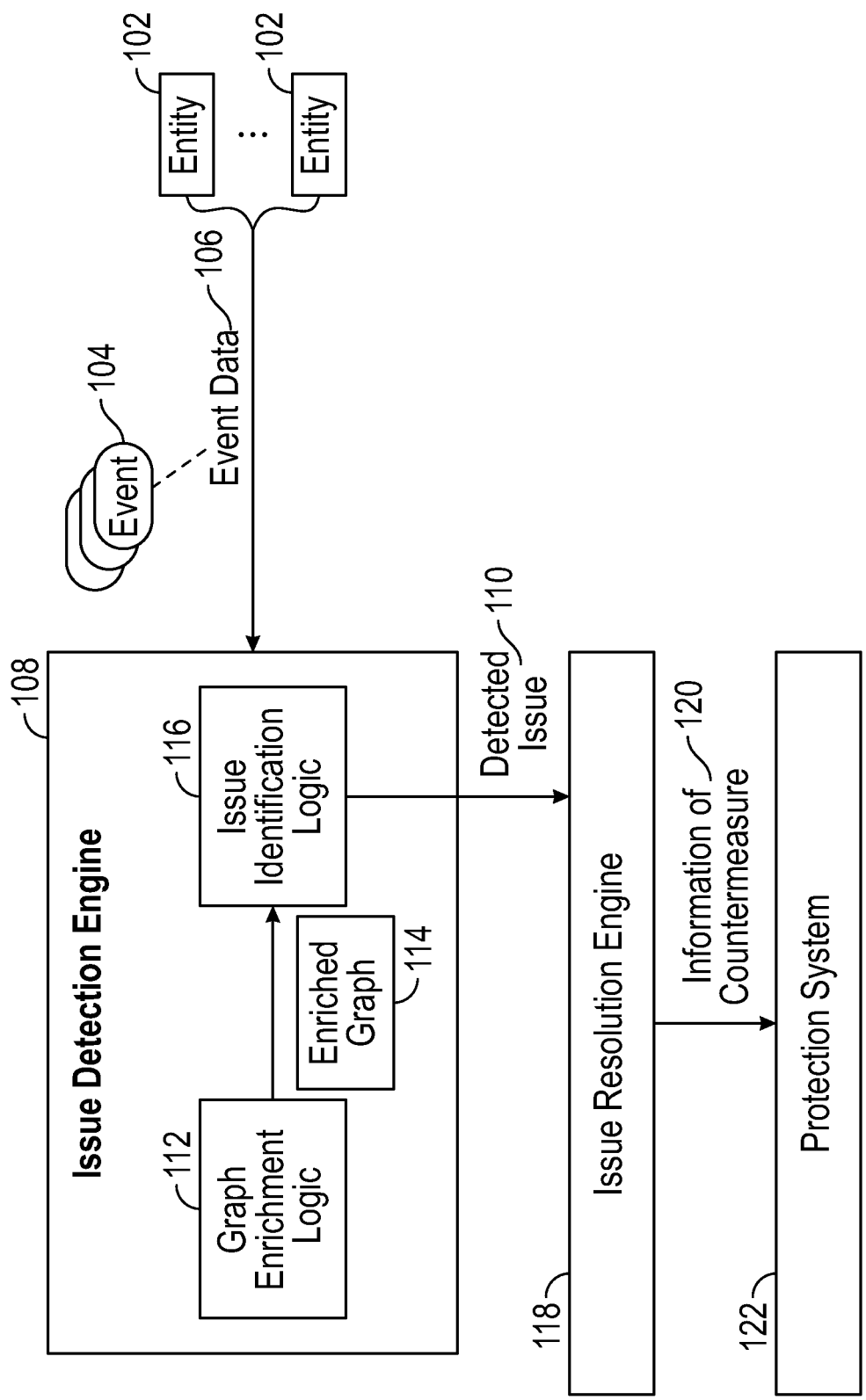
FIG. 1 is a block diagram of an arrangement including an issue detection engine, an issue resolution engine, and a protection system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain events (or collections of events) due to behaviors of entities in a computing environment can be considered anomalous. Examples of entities can include users, machines (physical machines or virtual machines), programs, sites, network addresses, network ports, domain names, organizations, geographical jurisdictions (e.g., countries, states, cities, etc.), or any other identifiable element that can exhibit a behavior including actions in the computing environment. A behavior of an entity can cause an anomalous event if the behavior deviates from an expected rule, criterion, threshold, policy, past behavior of the entity, behavior of other entities, or any other target, which can be predefined or dynamically set.

An example of an anomalous behavior of a user involves the user making greater than a number of login attempts into a computer within a specified time interval, or a number of failed login attempts by the user within a specified time interval. An example of an anomalous behavior of a machine involves the machine receiving greater than a threshold number of data packets (such as due to a port scan or a denial-of-service attack) within a specified time interval, or a number of login attempts by users on the machine that exceed a threshold within a specified time interval. Another example of an anomalous behavior includes exfiltration, which involves the unauthorized transfer or copying of data from a network or machine to a destination outside the network or machine.

To identify issues due to anomalous behavior in a system (e.g., a network, a machine, a collection of machines, a program, a collection of programs, etc.), information of activities (in the form of data packets, requests and responses, etc.) can be analyzed. Issues due to anomalous behaviors can be referred to as "anomalous issues," which can include any or some combination of: a security attack of a system, a threat that can cause an error, reduced performance of a machine or program (or a collection of machines or programs), stolen or other unauthorized access of information, and so forth.

In a large system (e.g., a large network with a large number of entities), there can be a large amount of information of activities to be analyzed. Since many of the events represented by the information of activities are benign (i.e., not associated with anomalous issues), the processing of the large amount of information of activities to identify anomalous issues can be burdensome and slow, and may produce inaccurate results.

Moreover, some anomalous issues relate not to a single event, but to a chain of events (e.g., a collection of events correlated in time, such as during a time window, a collection of events correlated by location or by an entity, etc.). As used here, an "event" can refer to any activity or collection of activities occurring in a system, where each activity can include any or some combination of: a communication of data, a response of an entity to a stimulus (e.g., a human stimulus, a machine or program stimulus, etc.), an error or fault condition, a measurement of a metric relating to an operation of a machine or program, and so forth.

Finding a chain of events to identify an anomalous issue can be challenging, particularly when there is a large amount of information to process. Failure to detect an issue associated with a chain of events in a timely manner can lead to a system (e.g., a computing environment) being compromised, such as due to an attack that renders portions of the system inoperative, an attack that renders data inaccessible, an attack that causes sensitive data to be stolen, and so forth. More generally, an issue associated with a chain of events can cause an error in the system, a failure or fault of the system, disclosure of sensitive data to unauthorized entities, or any other behavior or result that may be deemed undesirable.

In accordance with some implementations of the present disclosure, to more effectively detect a chain of events that corresponds to an issue in a system, an issue detection framework constructs, based on event data representing events in the system, a representation (e.g., a graph) of the events, where the representation includes information relating the events. The issue detection framework further computes issue indications (e.g., anomaly scores, threat scores, or any other indications of potential issues in the system) corresponding to potential issues in the system, and adds the issue indications to the representation to form an enriched representation. The issue detection framework searches the enriched representation to find a chain of events representing the issue in the system.

FIG. 1 is a block diagram of an example arrangement that includes a number of entities 102, including users, machines, and/or programs (a program includes machine-readable instructions). Activities of the entities 102 produce raw event data 106 that represent events 104 that have occurred in the arrangement.

Examples of events can include login events (e.g., events relating to a number of login attempts and/or devices logged into), events relating to access of resources such as websites, events relating to submission of queries such as Domain Name System (DNS) queries, events relating to sizes and/or locations of data (e.g., files) accessed, events relating to loading of programs, events relating to execution of programs, events relating to accesses made of components of the computing environment, errors reported by machines or programs, events relating to performance monitoring or measurement of various characteristics of the computing environment (including monitoring of network communication speeds, execution speeds of programs, etc.), and/or other events.

Data relating to events can be collected as event data records, which are part of the event data 106. An event data record can include various features (also referred to as "attributes"), such as a time feature (to indicate when the event occurred or when the event data record was created or modified). Further features of an event data record can depend on the type of event that the event data record represents. For example, if an event data record is to present a login event, then the event data record can include a time feature to indicate when the login occurred, a user identification feature to identify the user making the login attempt, a resource identification feature to identify a resource in which the login attempt was made, and so forth.

The event data 106 can include any or some combination of the following type of data: network event data, host event data, application data, and so forth. Network event data is collected on a network device such as a router, a switch, or other network device that is used to transfer data between other devices. Examples of network event data include Hypertext Transfer Protocol (HTTP) data, DNS data, Netflow data (which is data collected according to the Netflow protocol), and so forth.

Host event data can include data collected on computers (e.g., desktop computers, notebook computers, tablet computers, server computers, etc.), smartphones, Internet-of-Things (IoT) devices, or other types of devices. Host event data can include information of processes, files, operating systems, and so forth, collected in computers.

Application data can include data produced by application programs, such as logs of the activities of a Web server or DNS server.

An issue detection engine 108 receives the event data 106 that includes event data records. As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The issue detection engine 108 is able to identify, based on the event data 106, an issue (referred to as a "detected issue" 110 in FIG. 1). As used here, an "issue" can refer to a threat or any other anomaly that can cause an error, a failure, compromise of data, or any other undesirable action or result.

The issue detection engine 108 includes a graph enrichment logic 112 that produces an enriched graph 114 based on a graph of nodes that represent corresponding events (associated with the event data 106). The graph enrichment logic 112 constructs, based on the event data 106, a graph that includes nodes representing respective events. In addition, the graph enrichment logic 112 is able to compute anomaly scores and/or threat scores associated with respective anomalies and/or threats as indicated by the event data 106. An anomaly score indicates presence of a potential anomaly in a system. An "anomaly" can refer to abnormal behavior in the system. Also, in some cases, an anomaly can be related to an entity 102 and/or a time period (window).

A threat refers to an entity and/or an activity (or a collection of entities and/or activities) that may cause an error, a failure, a compromise of data, and so forth, in a system. Anomalies can be related to threats, and a model may be used to determine a relationship between an anomaly (or multiple anomalies) and a threat (or multiple threats). Threats can include security threats. Examples of security threats include an insider threat (e.g., an entity within a system that can cause damage to the system), an exfiltration threat (e.g., due to an entity attempting to steal sensitive data of the system), a denial-of-service (DOS) attack (e.g., due to entities attempting to flood a system with a massive amount of data that can overwhelm the resources of the system), and/or other threats. Other types of threats can include threats that cause a system to function sub-optimally, such as due to a misconfiguration of component(s) of the system.

The graph enrichment logic 112 adds information based on the anomaly scores and/or threat scores to the graph to form the enriched graph 114. The enriched graph 114 is provided to an issue identification logic 116, which is able to search the enriched graph 114 to find a chain of events that represents an issue in the system.

The graph enrichment logic 112 and the issue identification logic 116 can each be implemented as a hardware processing circuit of the issue detection engine 108, or as machine-readable instructions executable on the hardware processing circuit of the issue detection engine 108.

The issue identification logic 116 provides the identified issue as the detected issue 110 to an issue resolution engine 118, which is able to select a countermeasure for addressing the detected issue 110. For example, the issue resolution engine 118 may have access to correlation information that correlates issues to respective countermeasures to take to address the corresponding issues. Thus, given the detected issue 110 provided by the issue detection engine 108, the issue resolution engine 118 is able to access an entry of the correlation information that maps to the detected issue 110, to identify the corresponding countermeasure. Alternatively, the issue resolution engine 118 can identify the countermeasure based on application of a rule or based on a policy, where the rule or policy can specify which countermeasure to use for a respective issue, based on a criterion, or multiple criteria.

A "countermeasure" can refer to a remedial action, or a collection of remedial actions, that can be performed to address a detected issue.

Information of the countermeasure 120 can be provided to a protection engine 122. For example, the information of the countermeasure 120 can include a request, a command, or any other indication that can be used by the protection system 122 to implement the countermeasure to resolve the detected issue 110. The protection system 122 can include a machine, a collection of machines, a program, a collection of programs, or any entity or collection of entities that is able to perform the remedial action(s) of the countermeasure specified by the countermeasure information 120.

For example, the protection system 122 can include any or some combination of the following: a firewall that allows outward communication while blocking certain incoming communications to a system; an intrusion detection system to detect unauthorized intrusion of a system; a disabling system that is able to shut down a device, prevent communication by the device with a network, shut down programs in the device; an anti-malware tool that is able to scan a device, a network, etc., to identify malware and to either remove or quarantine the malware; and so forth.

Figure 2:
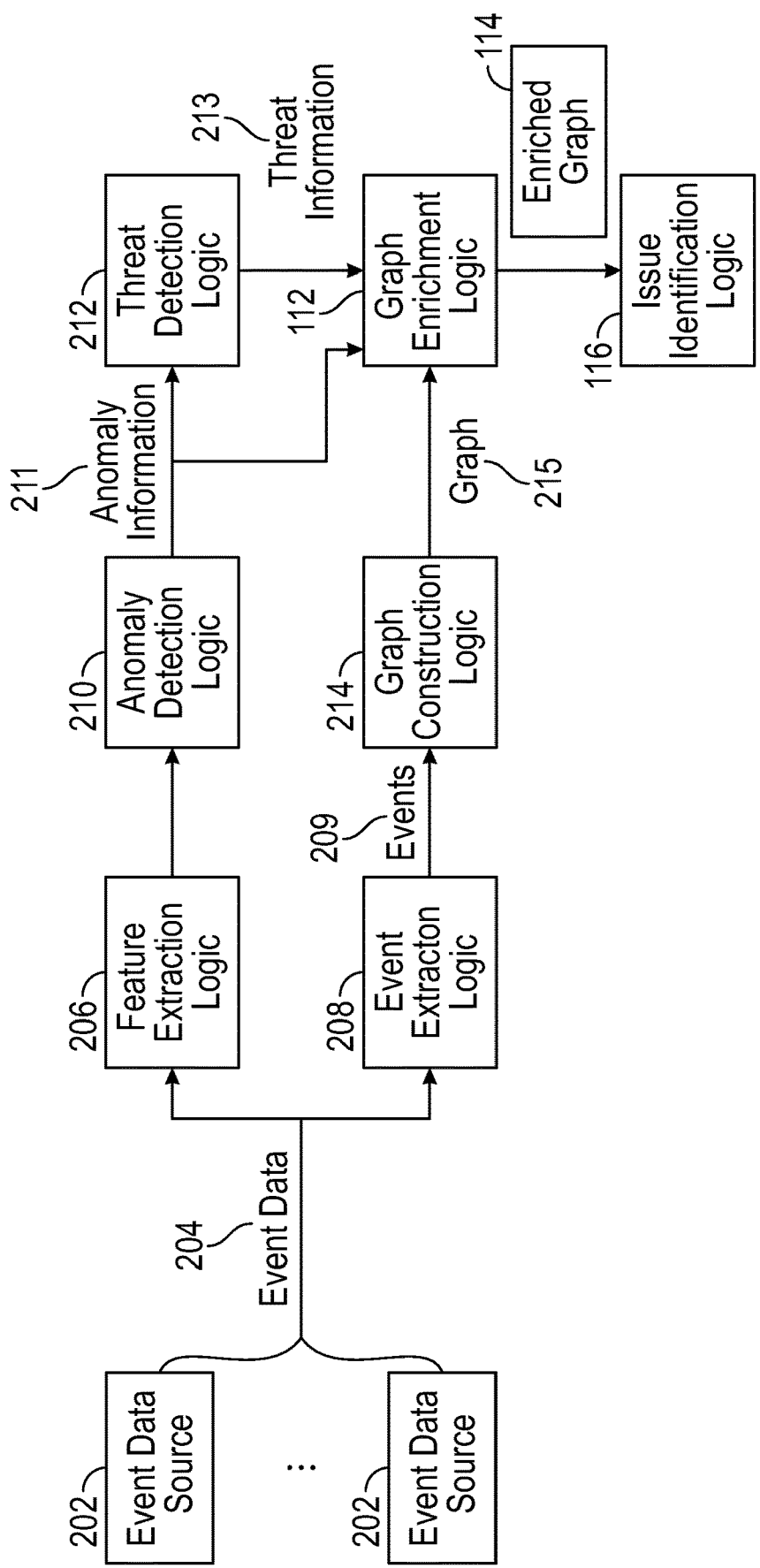
FIG. 2 is a block diagram showing components and an issue detection process according to some examples.

FIG. 2 is a block diagram showing components and a process performed by the components according to some examples. Various event data sources 202 can output event data 204, which can be similar to the event data 106 of FIG. 1.

The event data sources 202 can include collection agents distributed throughout a computing environment, such as on computers, communication nodes, storage devices, servers, and so forth. For example, collection agents can be part of the entities 102 shown in FIG. 1. Some of the event data sources 202 can be implemented as machine-readable instructions. Alternatively, some of the event data sources 202 can include hardware event data collectors.

FIG. 2 depicts various "logic," which can be implemented as a hardware processing circuit or a combination of a hardware processing circuit and machine-readable instructions executable on the hardware processing circuit.

The event data 204 is provided to a feature extraction logic 206 and an event extraction logic 208. The feature extraction logic 206 is able to extract features (also referred to as "attributes") from the event data 204.

The extracted features are provided by the feature extraction logic 206 to an anomaly detection logic 208, which is able to identify anomalies and compute respective anomaly scores for the identified anomalies.

Information relating to the anomalies (depicted as anomaly information 211 in FIG. 2) is provided by the anomaly detection logic 210 to a threat detection logic 212, which is able to identify threats based on the anomaly information 211. Information of the identified threats (depicted as threat information 213) is provided by the threat detection logic 212 to the graph enrichment logic 112.

In parallel with the tasks performed by the feature extraction logic 206, the anomaly detection logic 210, and the threat detection logic 212, the event extraction logic 208, a graph construction logic 214, and the graph enrichment logic 112 can perform their respective tasks.

The event extraction logic 208 extracts events from the event data 204. Information of the events (209) is provided by the event extraction logic 208 to the graph construction logic 214. Based on the extracted events, the graph construction logic 214 constructs a graph 215 of nodes, where nodes represent the events extracted by the event extraction logic 208. The graph 215 also includes links between the nodes, where the links depict relationships among the nodes. The relationships can include any or some combination of the following: a temporal relationship between events (e.g., two events, or more than two events, occur within a time interval of one another), a physical relationship (e.g., the events occurred on a common machine or are caused by a same entity, such as a user, a program, or a machine), or any other type of relationship.

The graph 215 produced by the graph construction logic 214 is provided to the graph enrichment logic 112, which is able to add information relating to the anomalies (the anomaly information 211) identified by the anomaly detection logic 210 and information of the threats (the threat information 213) identified by the threat detection logic 212 to the graph, to form the enriched graph 114. The enriched graph 114 is provided to the issue identification logic 116, which is able to perform a search of the enriched graph to find a chain of events corresponding to a detected issue.

The following describes further details relating to example tasks performed by the various logic shown in FIG. 2.

In some examples, the features extracted by the feature extraction logic 206 from the raw event data 204 can be in the form of rows or any other collections of features. Each row can include a timestamp, a source network address (e.g., a source Internet Protocol (IP) address) of a source entity (e.g., a machine or program) that is a source of event data, a source port number that identifies a port (e.g., a Transmission Control Protocol (TCP) port) of the source entity, a destination IP address (e.g., destination IP address) of a destination entity (e.g., a machine or program) that is a destination of event data, a destination port number that identifies a port of the destination entity, a protocol used in communication of data, a number of bytes of data transferred, and/or other fields.

In other examples, the extracted features can alternatively or additionally identify users (user identifiers such as email addresses, employee numbers, phone numbers, etc.). The features of the event data 204 can relate to respective users, machines, programs, individual communication flows (of data), or other events in a system. The number of bytes transferred can include, for a network address, a number of incoming or outgoing bytes, a number of packets, or a number of communication flows that have passed through the network address, a number of external hosts or domains contacted, a number of incoming or outgoing bytes on different ports, and so forth.

Figure 3:
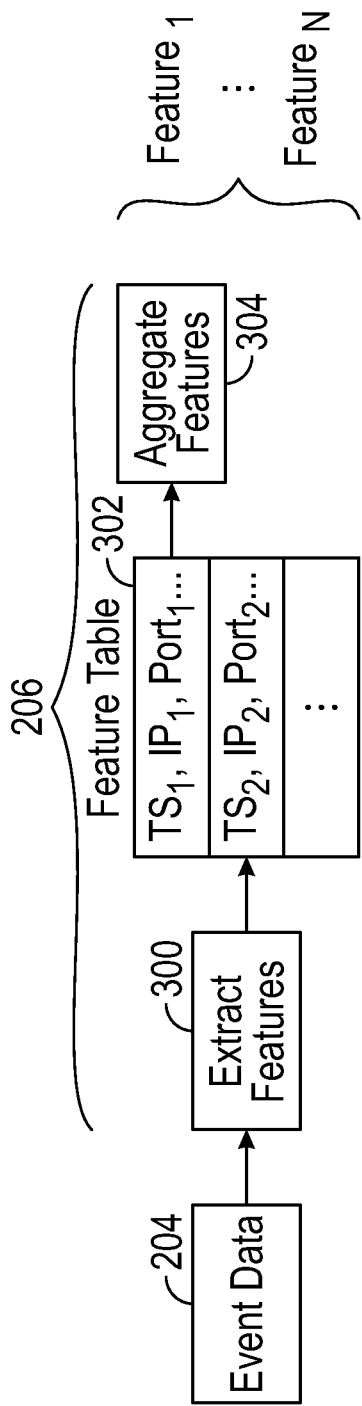
FIG. 3 is a block diagram showing a feature extraction according to some examples.

As shown in FIG. 3, the output of a feature extraction (300) performed by the feature extraction logic 206 can include a feature table 302 (or other data structure), where the feature table can include entries each including a collection of features. Each entry of the feature table 302 includes a timestamp (TS), an IP address, a port number, and so forth.

The feature extraction logic 206 can further derive additional features (in addition to the extracted features in the feature table 302) by aggregating (304) values of certain extracted features, such as by aggregating values of the number of bytes features in entries of the feature table 302 associated with a given network address (a source network address, a destination network address, or a combination of a source network address and destination address) or a user and that occur within a specified time window, at a specified location, and so forth.

For example, to derive the number of bytes associated with a particular IP address ($IP_1$), the feature extraction logic 206 aggregates (e.g., sums) the values of the number of bytes feature in the entries of the feature table 302 that are associated with the particular IP address within a specified time window.

In other examples, other types of feature aggregations can be performed, such as aggregating the number of packets transmitted and/or received by an IP address or user, the number of communication flows associated with an IP address or user, a number of events associated with an IP address or user, and so forth.

In further examples, extracted features can be associated with a user (in such examples, an IP address in an entry of the feature table 302 is replaced with a user identifier).

The feature extraction logic 206 outputs features $Feature_1, \ldots, Feature_N$, where $N \geq 1$. The output $Feature_1, \ldots, Feature_N$ can include derived features produced by the feature aggregation (304) and extracted features performed by the feature extraction (300).

The anomaly detection logic 210 determines abnormal behavior based on the features or groups of features output by the feature extraction logic 206. In some examples, machine learning anomaly detection techniques 402 (FIG. 4) can be used to determine the presence of abnormal behavior in the features or groups of features. Some general approaches of machine learning anomaly detection techniques include any or some combination of the following: techniques that use of probabilistic models (e.g., Bayesian techniques), low dimensional embedding based techniques (e.g., Principal Component Analysis (PCA), autoencoder, etc.), graph-based techniques, prediction-based techniques, density-based techniques, and so forth.

Some anomaly detection techniques may combine multiple techniques. An anomaly detection technique may be an unsupervised, a supervised, or a semi-supervised technique. The output of the anomaly detection for a feature or a group of features is an anomaly score, which can be non-negative in some examples.

The output of the anomaly detection technique 210 performed by the anomaly detection logic 210 includes anomaly scores $AS_1, \ldots, AS_M$, where $M \geq 1$ and can be the same as or different from N. Each anomaly score is computed for a respective feature or group of features. In some examples, a higher value of an anomaly score indicates a greater likelihood of a detected anomaly, and a lower value of an anomaly score indicates a lower likelihood of a detected anomaly.

Figure 4:
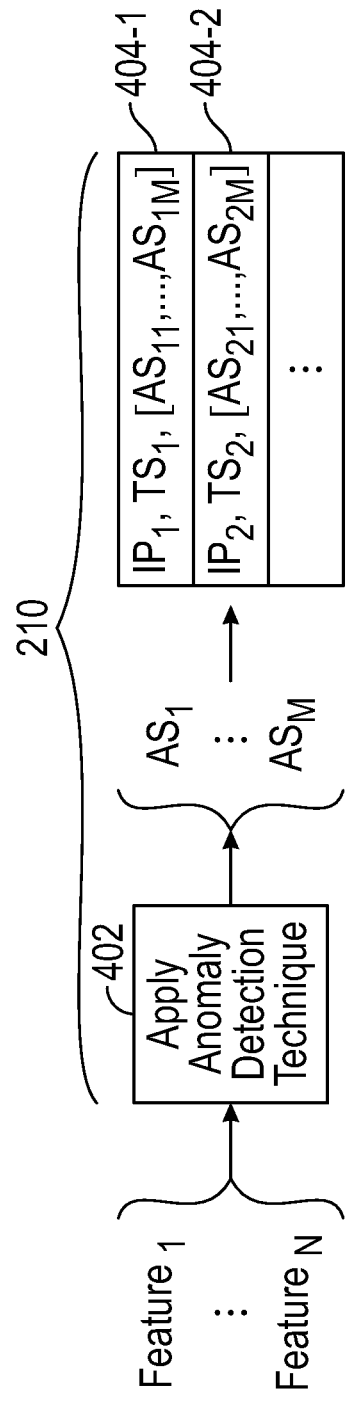
FIG. 4 is a block diagram showing an anomaly detection according to some examples.

In examples where features are aggregated by IP addresses, the anomaly detection technique 210 can produce anomaly score vectors 404-1, 404-2, and so forth, as shown in FIG. 4. Each anomaly score vector 404-$i$ (where $i=1, 2, \ldots$) includes an IP address, a timestamp (TS), and a corresponding collection of anomaly scores that represent anomaly scores for features associated with the corresponding IP address and that occur within a time window corresponding to the timestamp.

In other examples, each anomaly score vector can include anomaly scores associated with a user (in such examples, an IP address in the anomaly score vector is replaced with a user identifier).

In some examples, the anomaly detection logic 210 can rank the IP addresses in the anomaly score vectors based on values of the anomaly scores associated with the IP addresses. For example, the values of the anomaly scores in each given anomaly score vector 404-$i$ can be aggregated (e.g., summed, averaged, etc.) to produce an aggregate score value. The ranking of the IP addresses in the anomaly score vectors can be based on a comparison of the aggregate score values. As shown in FIG. 4, each anomaly score is associated with a timestamp, which specifies a respective time window. In some examples, time windows for respective collections of anomaly scores for different IP addresses (or alternatively, different users), can have a uniform window size, or alternatively, can have different window sizes.

The anomaly detection logic 210 can select only a subset of the IP addresses in the anomaly score vectors (e.g., only a top number of IP addresses by ranking). The selected subset of IP addresses are further considered—the remaining IP addresses in the anomaly score vectors are not considered further.

In other examples where anomaly score vectors are associated with user identifiers, then a subset of user identifiers can be selected for further consideration.

Figure 5:
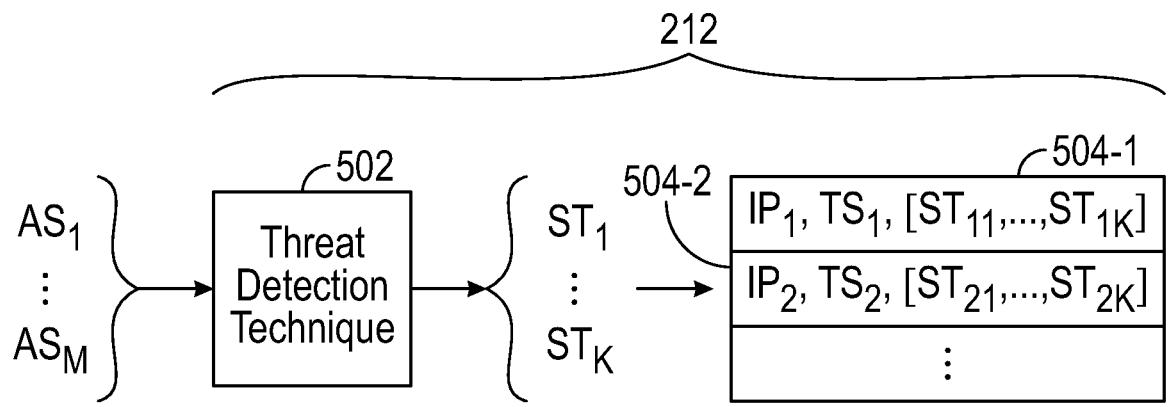
FIG. 5 is a block diagram showing a threat detection according to some examples.

As shown in FIG. 5, the threat detection logic 212 uses a threat detection technique 502 to derive threat scores for threats identified based on anomalies detected by the anomaly detection logic 210. The anomaly scores $AS_1, \ldots, AS_M$ computed by the anomaly detection logic 210 relate to threats; however, the precise relationship between the $AS_1, \ldots, AS_M$ and the threats is unknown.

The threat detection technique 502 can apply a model that relates anomaly scores of anomalies to respective different types of threats. The model may have been derived based on training data or can be provided by a human expert. The threat scores output by the threat detection technique 502 are in the form of $ST_1, \ldots, ST_K$, where $K \geq 1$. $ST_1$ is a threat score of a first type of threat, and $ST_K$ is a threat score of another type of threat. Each threat score can indicate a likelihood of the threat being present.

Examples of different types of threats include an insider threat (e.g., an entity within a system that can cause damage to the system), an exfiltration threat (e.g., due to an entity attempting to steal sensitive data of the system), a denial-of-service (DOS) attack (e.g., due to entities attempting to flood a system with a massive amount of data that can overwhelm the resources of the system), and/or other threats.

In examples where features are aggregated by IP addresses, threat score vectors 504-1, 504-2, . . . , can be produced as shown in FIG. 5. Each threat score vector includes an IP address, a timestamp (TS), and a collection of threat scores (ST) that represent likelihood of threats associated with the IP address and that occur within a time window corresponding to the timestamp.

In other examples, a threat score vector can include a user identifier, a timestamp, and a collection of threat scores.

Figure 6:
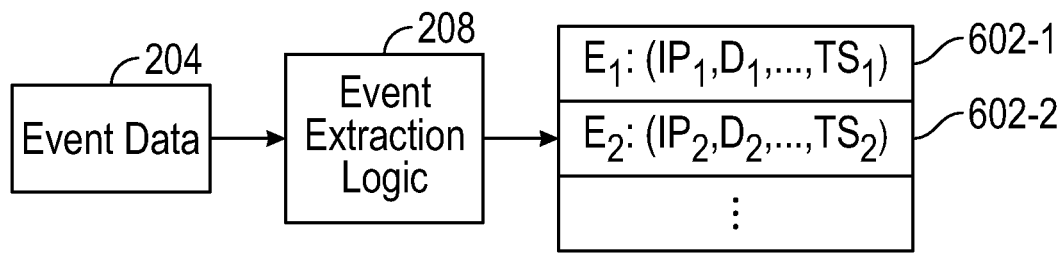
FIG. 6 is a block diagram showing an event extraction according to some examples.

As shown in FIG. 6, the event extraction logic 208 extracts events from the event data 204, and produces event data records 602-1, 602-2, and so forth. Each event, $E_j$ ($j=1, 2, \ldots$), can include various fields. In the example of FIG. 6, each event includes an IP address, an external domain (e.g., a website, a server, etc.) accessed (D), and a timestamp (TS). An external domain can refer to a domain that is external of a given system. In further examples, each event can include additional or alternative fields, such as an internal domain accessed, a number of bytes transferred, a protocol used, and so forth.

Figure 7:
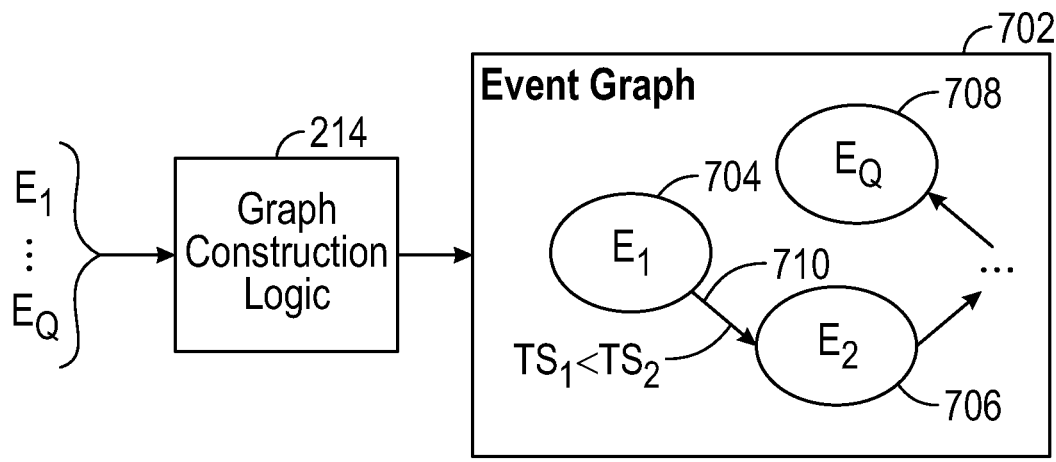
FIG. 7 is a block diagram showing a graph construction according to some examples.

As shown in FIG. 7, the graph construction logic 214 generates an event graph 702 including nodes 704, 706, and 708 that represent corresponding events $E_1$, $E_2$, and $E_Q$, where $Q \geq 1$. A link between a pair of the nodes of the event graph 702 represents a relationship between the events represented by the pair of nodes. The relationship can be a temporal relationship (the corresponding events occurred within a specified time of one another), a physical relationship (the corresponding events occurred in the same machine or were caused by the same program), and so forth.

The links between nodes in the event graph 702 can also include directed edges. A directed edge represents a direction from a first node to a second node. For example, a link 710 points from the node 704 (representing the event $E_1$) to the node 706 (representing the event $E_2$). For example, the directed edge corresponding to the link 710 can indicate that the timestamp $TS_1$ of the event $E_1$ is before the timestamp $TS_2$ of the event $E_2$. By using directed edges, an entity analyzing the event graph 702 can more easily determine the temporal relationships between different events.

In other examples, events are related if the entities (represented by respective IP addresses) associated with the events performed similar actions within a time interval threshold. For example, if both IP addresses interacted with the same external domain within a short time interval, a link can be added between the nodes representing the events in the event graph 702.

In some examples, the events extracted by the event extraction logic 208 from the event data 204 may be preprocessed (such as by the event extraction logic 208) to filter and/or combine events. For example, in some cases, innocuous events such as events relating to traffic between internal entities within a system, or events between internal entities and known whitelisted external domains may be discarded as part of the filtering. Additionally, in some examples, multiple consecutive events related to the same interaction may be combined together by the event extraction logic 208.

Figure 8:
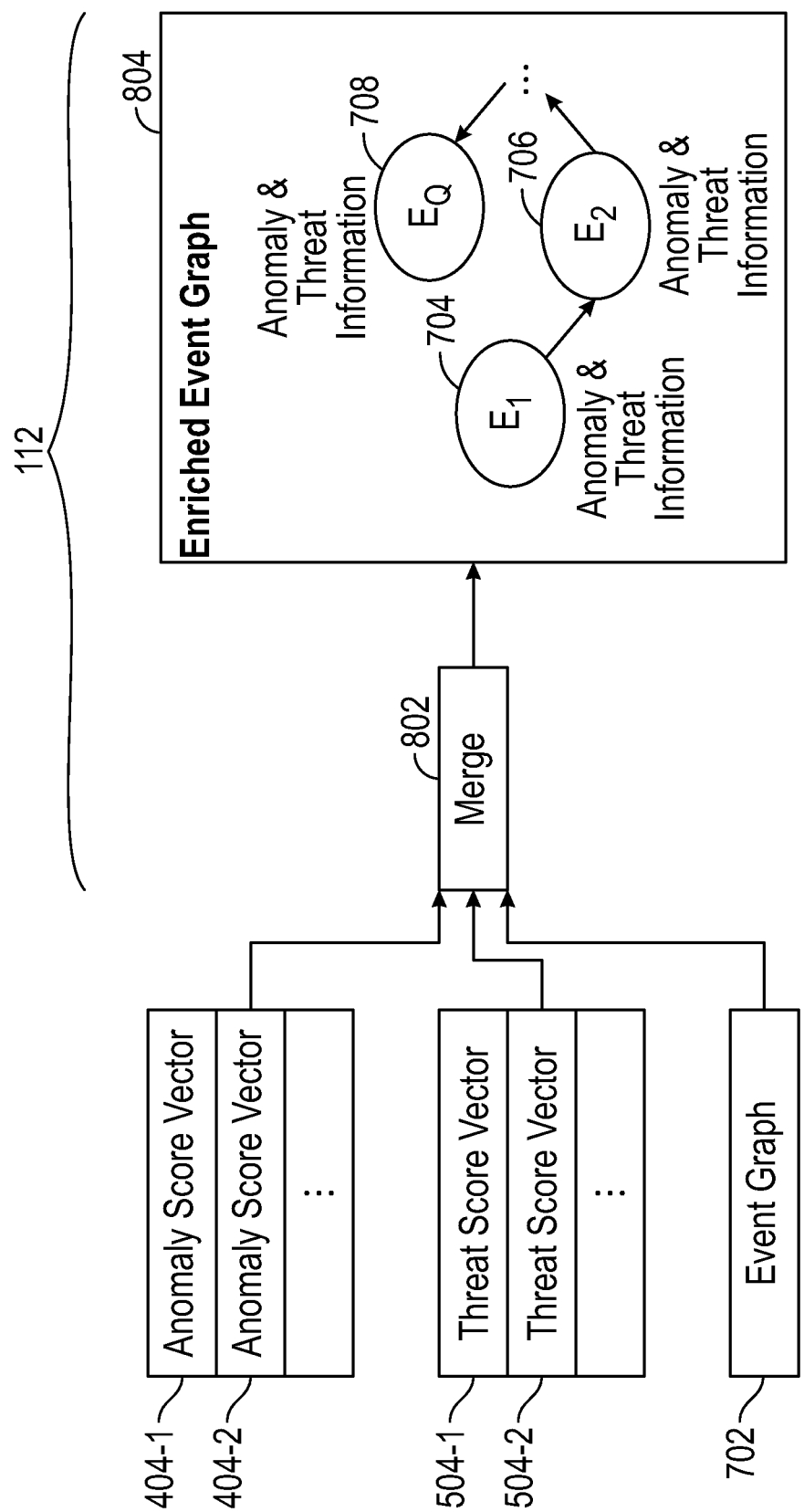
FIG. 8 is a block diagram showing an enriched graph construction according to some examples.

As shown in FIG. 8, the graph enrichment logic 112 merges (802) the anomaly score vectors 404-1, 404-2, . . . , and threat score vectors 504-1, 504-2, . . . , with the event graph 702, to produce an enriched event graph 804. In other examples, the anomaly score vectors 404-1, 404-2, . . . , and threat score vectors 504-1, 504-2, . . . , can first be merged before merging with the event graph 702.

The event graph 702 constructed by the graph construction logic 214 can be large (e.g., including millions or billions of events/nodes), and thus it may be challenging to process the event graph 702. By merging (802) the anomaly score vectors 404-1, 404-2, . . . , and the threat score vectors 504-1, 504-2, . . . , with the event graph 702, anomaly and threat information can be associated with each node 704, 706, and 708 in the enriched event graph 804. The anomaly and threat information can include a subset or all of the information of the anomaly score vectors and threat score vectors.

The anomaly and threat information can be added as metadata that is associated with the respective nodes of the enriched event graph 804. By associating the anomaly and threat information with respective nodes that represent events in the enriched event graph 804, processing of the enriched event graph 804 can focus on those nodes associated with anomaly scores and/or threat scores indicating higher likelihoods of the respective anomalies and/or threats. In other words, an event represented by a node associated with an anomaly score and/or a threat score indicating a lower likelihood of presence of the respective anomaly and/or threat may not be considered or processed from consideration as an event that caused the respective anomaly and/or threat. In some examples, an event represented by a given node associated with an anomaly score and/or a threat score indicating a lower likelihood of presence of the respective anomaly and/or threat may still remain in the enriched event graph 804 in case the given node connects two nodes with high anomaly/threat scores.

In such case, the given node is an important node and may be part of a kill chain. Thus, according to some examples of the present disclosure, by trying to discover anomaly paths the techniques or mechanisms may also find anomalous events that were not detected earlier (because, e.g., they looked very similar to normal events).

Figure 9:
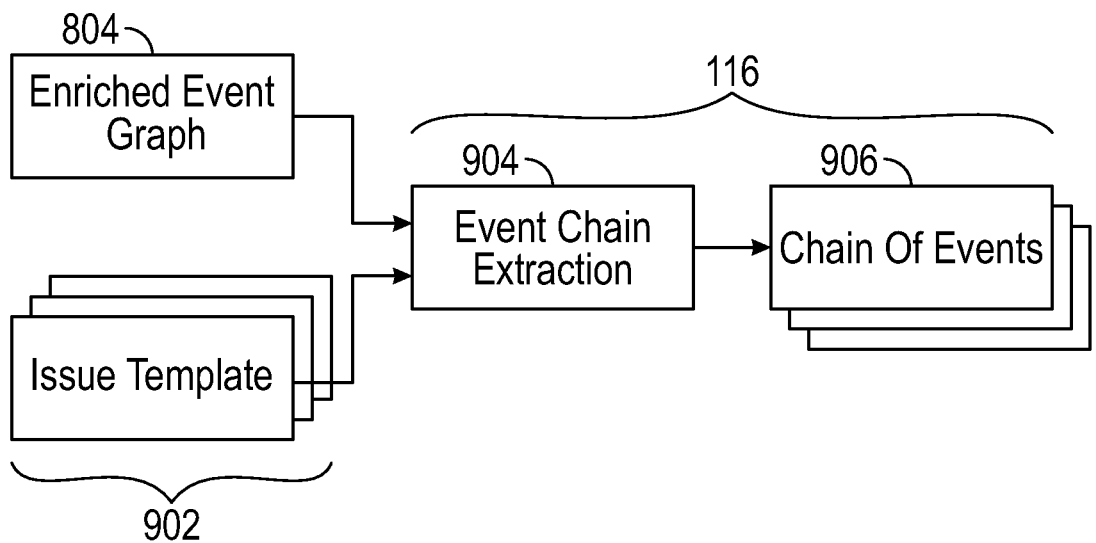
FIG. 9 is a block diagram showing an event chain identification according to some examples.

As shown in FIG. 9, the issue identification logic 116 performs a search of the enriched event graph 804 to identify a chain of events that correspond to an issue (e.g., an attack of a network, a machine, a program, etc.). The chain of events can also be referred to as an attack sequence or a kill chain.

The issue identification logic 116 performs event chain extraction (904). For example, the issue identification logic 116 can perform the event chain extraction (904) by starting at a node in the enriched event graph 804 with high anomaly scores and/or threat score (e.g., anomaly score and/or threat score that exceeds a specified threshold(s)). From the starting node, the issue identification logic 116 grows a path from the starting to other nodes in the enriched event graph 804. A path can include a sequence of nodes that represent a temporal sequence of events, for example.

The following discusses an example where anomaly scores associated with the nodes of the enriched event graph 804 are used to compute a path score. In other examples, similar techniques can be applied that consider threat scores or both anomaly scores and threat scores to compute path scores.

As a specific example, a path can include a starting node $n_s$ and other nodes $n_1$, $n_2$, and $n_3$ that can extend in either direction from the starting node $n_s$. For example, the path can include the nodes in the following sequence: $\{n_1, n_s, n_2, n_3\}$. The nodes $n_1$, $n_s$, $n_2$, and $n_3$ are associated with respective anomaly scores $AS_1$, $AS_s$, $AS_2$, and $AS_3$. The path score for this path can be computed as:

$$\text{Path-score} = \Sigma_{seq} AS_i - \lambda |seq|, \qquad \text{(Eq. 1)}$$

In Eq. 1, seq represents the path, and the path score is computed as a sum of the anomaly scores of the events represented by the nodes in the path, less a penalty value $\lambda|seq|$, where $|seq|$ is the length of the path seq (e.g., length is equal to the number of nodes in the path), and $\lambda$ is a scaling constant and is determined experimentally or in another manner.

The path score of a path is defined in terms of an aggregation of the anomaly scores of the nodes in the path, and is penalized for the length of the path (e.g., with the penalty value $\lambda|seq|$). The issue identification logic 116 seeks to find shorter paths of nodes with higher anomaly scores as chains of events (906). To make the search space manageable, an upper bound length can be set on the length of the path; for example, a path to be considered by the issue identification logic 116 to determine whether the path constitutes a chain of events 906 has to have a length that is shorter than or equal to the upper bound length.

Also, the issue identification logic 116 can identify some top number (e.g., P≥1) of paths as being chains of events (906). Eq. 2 below computes the top P paths containing node $n_i$.

$$Paths(n_i) = \underset{seq}{argtop} P \sum_{seq} AS_i - \lambda|seq|, \qquad \text{(Eq. 2)}$$

$$x_i \in seq, |seq| < L_{max},$$

In the Eq. 2, $L_{max}$ represents the upper bound length.

Once all the paths in the enriched event graph 804 that satisfy the foregoing equation are identified, the identified paths are compared with issue templates 902 in a template library that can be stored in a storage device (or multiple storage devices). Each issue template 902 includes a template chain of events that have been previously identified or has been derived by a human expert as representing a respective issue (e.g., an attack).

The issue identification logic 116 can determine if an identified path matches any of the issue templates 902. If the identified path matches an issue template 902, then the identified path can potentially be indicated as being a chain of events 906 that represents an issue.

In some examples, the matching of identified paths to issue templates 902 can include fuzzy matching that produces a similarity score (such as between 0 and 1, where 0 indicates no match, 1 a perfect match, and a score in between indicates a partial match). This similarity score is aggregated (e.g., summed, averaged, etc.) with the path score of the path to produce the final path score.

The final path scores of respective identified paths are sorted, and the top R≥1) paths are selected and identified as a chain of events 906. The identified chains of events (906) can represent respective detected issues, and can be provided to the issue resolution engine 118 (FIG. 1) or to a human analyst to determine a countermeasure to take to resolve the issue.

By using techniques or mechanisms according to some examples, detection of issues (e.g., attacks) that correspond to a chain of events can be performed, not just anomalies occurring at a specific point in a system. By enriching an event graph with anomaly and threat information, searching for paths of nodes representing events that correspond to issue of interest can be made more computationally feasible.

Figure 10:
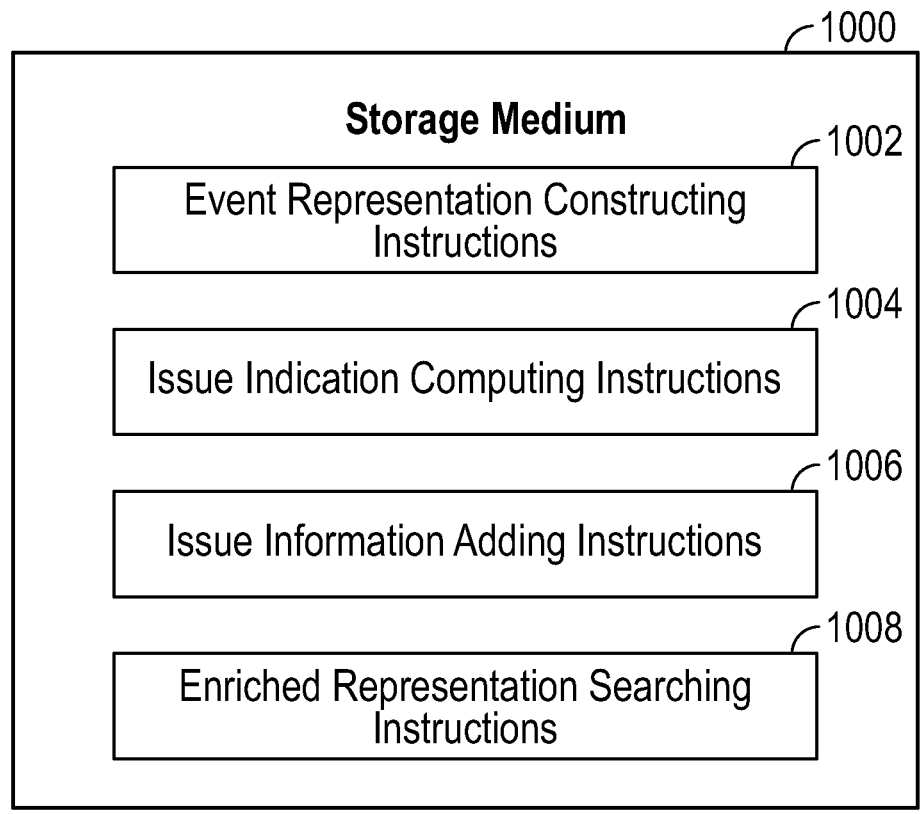
FIG. 10 is a block diagram of a storage medium storing machine-readable instructions according to some examples.

FIG. 10 is a block diagram of a non-transitory machine-readable or computer-readable storage medium 1000 storing machine-readable instructions that upon execution cause a system to perform various tasks. The machine-readable instructions include event representation constructing instructions 1002 to construct, based on event data representing a plurality of events in the system, a representation of the plurality of events, the representation including information relating the events. For example, the representation that is constructed can be the event graph 702 of FIG. 7. The information relating the events in the event graph 702 can include links between nodes.

The machine-readable instructions further include issue indication computing instructions 1004 to compute issue indications (e.g., anomaly scores and/or threat scores) corresponding to potential issues in the system.

The machine-readable instructions further include issue information adding instructions 1006 to add information based on the issue indications to the representation to form an enriched representation (e.g., the enriched event graph 804 of FIG. 8).

The machine-readable instructions further include enriched representation searching instructions 1008 to search the enriched representation to find a chain of events representing an issue in the system.

In some examples, searching the enriched representation to find the chain of events representing the issue includes identifying a node, in the enriched representation, that represents an event associated with an issue indication that indicates likely presence of a potential issue, and identifying a path from the identified node to other nodes in the enriched representation. The other nodes represent events having a specified relationship with the event represented by the identified node, where the chain of events includes the events represented by the nodes connected by the identified path.

In further examples, the system computes an aggregate issue indication for the path (e.g., the path score computed according to Eq. 1 above) based on aggregating issue indications associated with the events represented by the nodes connected by the identified path. The system identifies the events connected by the identified path as being part of the chain of events in response to the aggregate issue indication.

Figure 11:
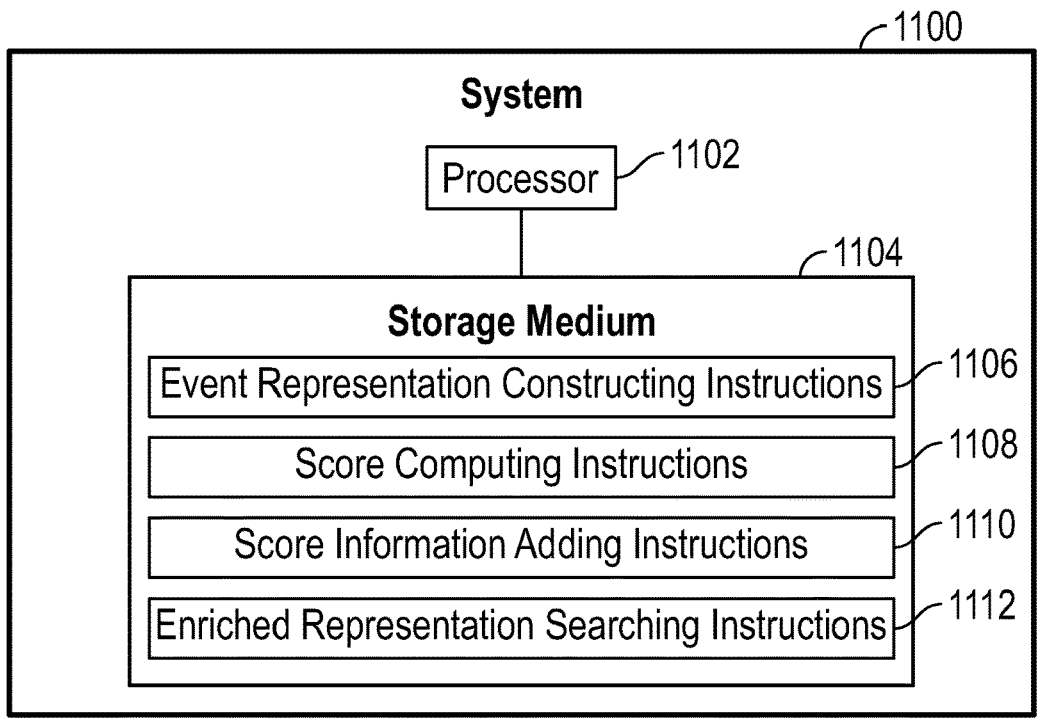
FIG. 11 is a block diagram of a system according to some examples.

FIG. 11 is a block diagram of a system 1100 that includes a hardware processor 1102 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 1100 further includes a non-transitory storage medium 1104 that stores machine-readable instructions executable on the hardware processor 1102 to perform respective tasks. Machine-readable instructions executable on a hardware processor can refer to the instructions executable on a single hardware processor or the instructions executable on multiple hardware processors.

The machine-readable instructions in the storage medium 1104 include event representation constructing instructions 1106 to construct, based on event data representing a plurality of events in a computing environment, a representation of the plurality of events, the representation including information relating the events.

The machine-readable instructions in the storage medium 1104 further include score computing instructions 1108 to compute scores corresponding to potential issues in the computing environment. The machine-readable instructions in the storage medium 1104 further include score information adding instructions 1110 to add information based on the scores to the representation to form an enriched representation. The machine-readable instructions in the storage medium 1104 further include enriched representation searching instructions 1112 to search the enriched representation to find a chain of events representing an issue in the computing environment.

Figure 12:
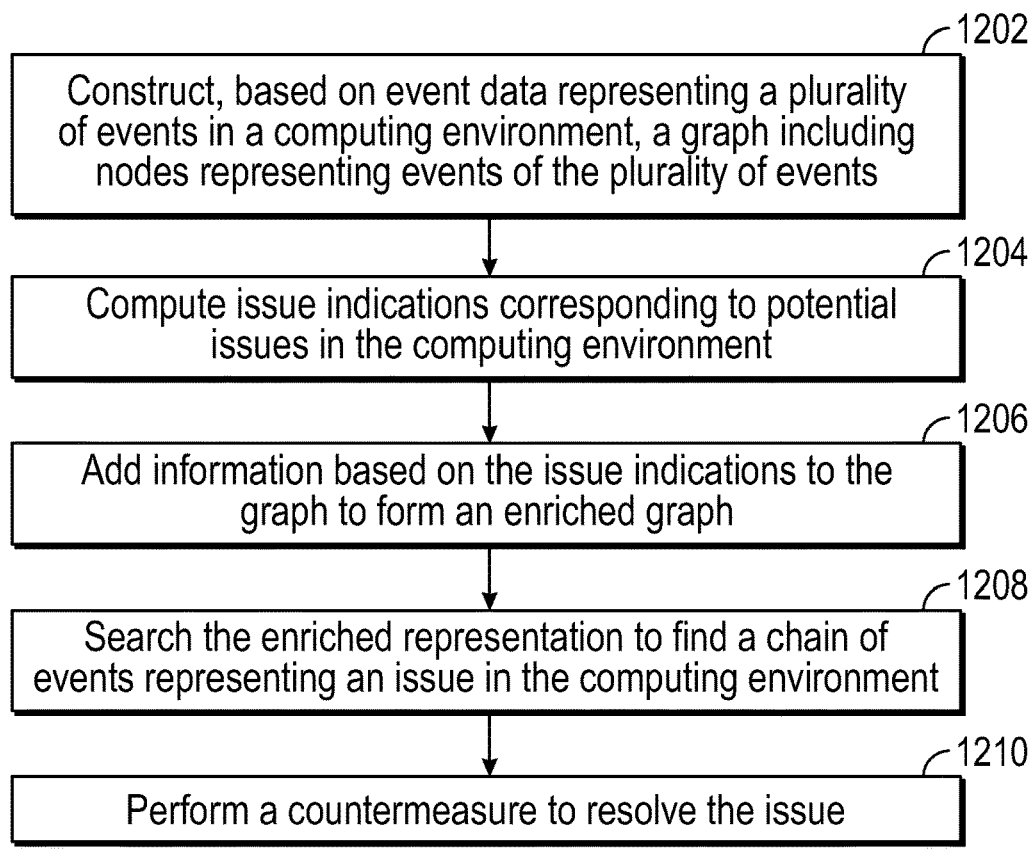
FIG. 12 is a flow diagram of a process according to further examples.

FIG. 12 is a flow diagram of a process performed by a system comprising a hardware processor. The process includes constructing (at 1202), based on event data representing a plurality of events in a computing environment, a graph including nodes representing events of the plurality of events. The process further includes computing (at 1204) issue indications corresponding to potential issues in the computing environment.

The process additionally includes adding (at 1206) information based on the issue indications to the graph to form an enriched graph. The process further includes searching (at 1208) the enriched representation to find a chain of events representing an issue in the computing environment. The process further includes performing (at 1210) a countermeasure to resolve the issue.

The storage medium 1000 (FIG. 10) or 1104 (FIG. 11) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   electronically collect event data, wherein the collected event data is in a form of a least one of electronic network event data, electronic host event data, and electronic application event data from at least one of a plurality of entities in a computing environment;
   construct, based on the collected event data representing a plurality of events in the computing environment, a representation of the plurality of events, the representation including links relating the plurality of events, wherein the representation includes a graphical representation of the plurality of events and the links include temporal links including sequential directional edges relating the plurality of events;
   compute issue indications corresponding to potential issues in the computing environment;
   add information based on the issue indications to the representation to form an enriched representation;
   search the enriched representation to find a chain of events representing an issue in the computing environment,
   wherein each event of the plurality of events represents an activity of the at least one of the plurality of entities; and
   electronically perform a countermeasure to resolve the issue represented by the chain of events in the computer environment, and
   wherein the issue indications comprise threat scores derived based on anomaly scores based on features of the collected event data, each threat score of the threat scores representing a likelihood of a threat in the computing environment.

2. The non-transitory machine-readable storage medium of claim 1, wherein the graphical representation comprises a graph of nodes that represent respective events of the plurality of events, and wherein the information based on the issue indications are added to the graph of nodes.

3. The non-transitory machine-readable storage medium of claim 1, wherein each anomaly score of the anomaly scores represent a likelihood of an anomaly in the computing environment.

4. The non-transitory machine-readable storage medium of claim 1, wherein add the information based on the issue indications to the representation to form the enriched representation comprises:
   associate the information based on the issue indications with nodes in the representation, the nodes representing respective events of the plurality of events.

5. The non-transitory machine-readable storage medium of claim 1, wherein search the enriched representation to find the chain of events representing the issue comprises:
   identify a node, in the enriched representation, that represents an event associated with an issue indication that indicates likely presence of a potential issue; and
   identify a path from the identified node to other nodes in the enriched representation, the other nodes in the enriched representation representing events having a specified relationship with the event represented by the identified node,
   wherein the chain of events includes the events represented by the nodes connected by the identified path.

6. The non-transitory machine-readable; storage medium of claim 5, wherein the specified relationship comprises a temporal relationship.

7. The non-transitory machine-readable storage medium of claim 5, wherein the instructions upon execution cause the system to:
   compute an aggregate issue indication for the identified path based on aggregating issue indications associated with the events represented by the nodes connected by the identified path; and
   identify the events connected by the identified path as being part of the chain of events in response to the aggregate issue indication.

8. The non-transitory machine-readable storage medium of claim 7, wherein the aggregate issue indication is further based on penalizing a value of the aggregate issue indication for a length of the identified path.

9. The non-transitory machine-readable storage medium of claim 5, wherein the instructions that upon execution cause the system to:
   compare a collection of the events connected by the identified path to a library including template chains of events representing respective issues; and
   identify the collection of the events connected by the identified path as the chain of events representing the issue in response to a match between the collection of the events and a chain of events in the library.

10. The non-transitory machine-readable storage medium of claim 9, wherein the instructions that upon execution cause the system to:
    compute an aggregate issue indication for the chain of events representing the issue based on issue indications associated with the events represented by the nodes connected by the identified path, and a similarity indication indicating a similarity between the collection of the events connected by the identified path and a matching template chain of events in the library.

11. A system, comprising:
    a processor; and
    a non-transitory storage medium comprising instructions executable on the processor to:
       electronically collect event data, wherein the collected event data is in a form of a least one of electronic network event data, electronic host event data, and electronic application event data from at least one of a plurality of entities in a computing environment;

construct, based on the collected event data representing a plurality of events in the computing environment, a representation of the plurality of events, the representation including links relating the plurality of events,
wherein the representation includes a graphical representation of the plurality of events and the links include temporal links including sequential directional edges relating the plurality of events;
compute scores corresponding to potential issues in the computing environment;
add information based on the scores to the representation to form an enriched representation;
search the enriched representation to find a chain of events representing an issue in the computing environment,
wherein each event of the plurality of events represents an activity of the at least one of the plurality of entities; and
electronically perform a countermeasure to resolve the issue represented by the chain of events in the computer environment,
wherein the search of the enriched representation to find the chain of events representing the issue comprises:
identify a node, in the enriched representation, that represents an event associated with a score that exceeds a threshold; and
identify a path from the identified node to other nodes in the enriched representation, the other nodes in the enriched representation representing events having a specified relationship with the event represented by the identified node,
wherein the chain of events includes the events represented by the nodes connected by the identified path.

12. The system of claim 11, wherein the scores comprise anomaly scores, and wherein the instructions are executable on the processor to:
extract features from the collected event data; and
compute the anomaly scores for the features.

13. The system of claim 11, Wherein the scores comprise threat scores representing threats m the computing environment.

14. The system of claim 11, wherein add the information based on the scores to the representation to form the enriched representation comprises:
associate the information based on the scores with nodes in the representation, the nodes in the representation representing respective events of the plurality of events.

15. The system of claim 11, wherein the instructions are executable on the processor to:
compute an aggregate score for the identified path based on aggregating scores associated with the events represented by the nodes connected by the identified path; and
identify the events connected by the identified path as being part of the chain of events in response to the aggregate score.

16. A method performed by a system comprising a hardware processor, comprising:
electronically collecting event data, wherein the collected event data is in a form of a least one of electronic network event data, electronic host event data, and electronic application event data from at least one of a plurality of entities in a computing environment;
constructing, based on the collected event data representing a plurality of events in the computing environment, a graph including nodes representing events of the plurality of events and temporal links including sequential directional edges relating the plurality of events;
computing issue indications corresponding to potential issues in the computing environment;
adding information based on the issue indications to the graph to form an enriched graph;
searching the enriched graph to find a chain of events representing an issue in the computing environment; and
electronically performing a countermeasure to resolve the issue represented by the chain of events in the computing environment,
wherein each event of the plurality of events represents an activity of the at least one of the plurality of entities,
wherein the searching of the enriched graph to find the chain of events representing the issue comprises:
identify a node, in the enriched graph, that represents an event associated with a score that exceeds a threshold; and
identify a path from the identified node to other nodes in the enriched graph the other nodes representing events having a specified relationship with the event represented by the identified node,
wherein the chain of events includes the events represented by the nodes connected by the identified path.

17. The method of claim 16, wherein computing the issue indications comprises computing anomaly scores of anomalies, and/or computing threat scores of threats based on the anomalies.

18. The method of claim 16, wherein adding information based on the issue indications to the graph to form an enriched graph including associating the information based on the issue indications with nodes in the graph.

* * * * *